105-138
E. Nott.
Stove Pipe.
No. 7.639 x
Patented Jun. 29, 1833.
Fig. 2.
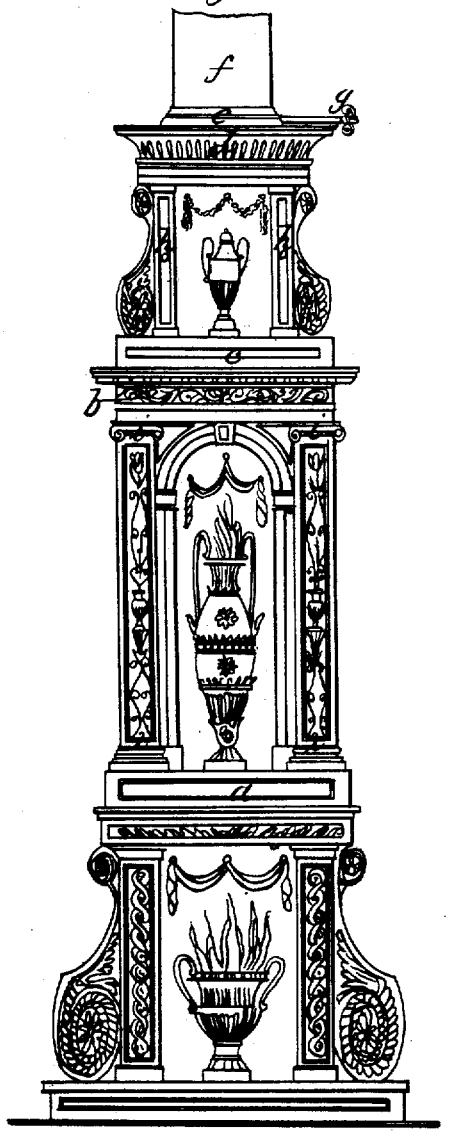
Fig. 3.
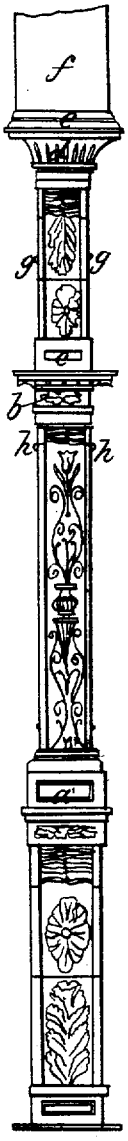
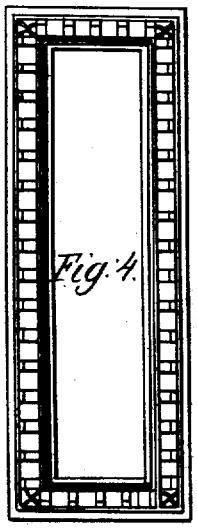
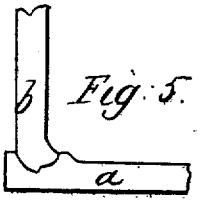
Fig. 5.
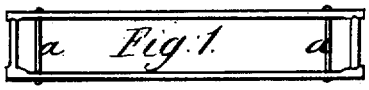
Fig. 1.
N. PETERS, PHOTO-LITHOGRAPHER, WASHINGTON, D. C.

76 39 X                    June 29. 1833                    213.

Case "5"

Eliphalet Nott

Letters Patent.

The Schedule referred to in these Letters Patent and making part of the same, containing a description in the words of the said Eliphalet Nott, himself of his improvement in preventing the escape of heat from the top of a pile of ignited fuel by placing over the same a moveable flat.

---

Case "No 5."

Specification of an improvement made in preventing the escape of heat from the upper surface of the fuel contained in stoves or furnaces during combustion, by placing over the same a moveable flat. Whereas the hotter the elements of combustion the intenser the combustion, and whereas a [illegible] covering over a pile of ignited fuel tends to prevent the escape of heat therefrom, therefore an improvement has been intro= duced and its effectiveness having been tested, by many expe= riments, is now deemed worthy of being carried into general use— which improvement consists.— In combining in a stove with an elongated chamber of combustion, having its inlet for fuel at or near the top, its outlet for flame at or near the bottom a moveable horizontal flat about half an inch thick and as large as will traverse freely the caliber of the chamber, the same to be of iron or other incombustible material and when placed over the pile of contained fuel, to be left free as the same burns away to descend thereon which flat must be raised and replaced as often as the stove is replenished with fuel—

For further information, reference must be had to the draw= ings and explanations hereunto appended.

Summary

The invention and improvement herein contemplated consists consists in preventing the unnecessary escape of heat from the top of a pile of fuel contained in an elongated chamber of combustion having its inlet for fuel at or near the top and its outlet for flame at or near the bottom, by placing over the same a moveable plate, of the requisite dimension for traversing the caliber, and left free, as the fuel burns away to descend therein.

I therefore claim as my invention and improvement, the preventing of the escape of heat from the top of a pile of ignited fuel contained in a chamber of combustion constructed as aforesaid, by combining therewith a moveable plate the same being placed over said fuel and left free to descend thereon, as aforesaid; together with the uses to which the same has been or may hereafter be applied.

Eliphalet Nott

Recd Witnesses
N.Y.C. D. Boyd
G. F. Yates 451 words.

(Granted June 24. 1833.)
[illegible]